United States Patent [19]

Dushane et al.

[11] Patent Number: 4,910,527
[45] Date of Patent: Mar. 20, 1990

[54] CONFIGURABLE KU-BAND RECEIVER FOR SATELLITE ANTENNA FEED

[75] Inventors: Steven Dushane, Canoga Park; Robert A. Luly, San Bernardino, both of Calif.

[73] Assignee: Janiel Corporation

[21] Appl. No.: 303,915

[22] Filed: Jan. 30, 1989

Related U.S. Application Data

[63] Continuation-in-part of Ser. No. 71,484, Jul. 7, 1987, Pat. No. 4,801,945.

[51] Int. Cl.$^4$ .............................................. H01Q 13/02
[52] U.S. Cl. ...................................... 343/786; 343/772
[58] Field of Search ............... 343/772, 786, 787, 840, 343/862

[56] References Cited

U.S. PATENT DOCUMENTS

| | | | |
|---|---|---|---|
| 4,740,795 | 4/1988 | Seavey | 343/786 |
| 4,785,306 | 11/1988 | Adams | 343/786 |
| 4,801,945 | 1/1989 | Luly | 343/786 |

OTHER PUBLICATIONS

Proper Feed Selection: First Step to Optimum System Performance, by John M. Seavey, Seavey Engineering Associates, Inc.
The Seavey 124 Prime/Prime Feeds by Product Review, Mark Long, Satellite Direct, Feb. 1987.
The Seavey ESR 124 Dual—Band Feed by Product Review, Satellite World, Mar., 1985.

Primary Examiner—Rolf Hille
Assistant Examiner—Doris J. Johnson
Attorney, Agent, or Firm—Poms, Smith, Lande & Rose

[57] ABSTRACT

A versatile dual band satellite system includes a main conductive mounting plate member with a central opening of a predetermined size, and a KU band pick-up unit mounted in the plate to face a satellite antenna. A dielectric funnel support is mounted on the side of the mounting plate toward the antenna, and includes a central opening of the same size as that in the mounting plate, for receiving a C-band pick-up unit. The system includes appropriate microwave chokes and microwave impedance-matching structure, to improve the rejection of spurious or off-axis signals, and to maximize signal strength at the input of both the KU band and the C-band units. With the mounting openings in the main mounting member and in the dielectric funnel support being identical, full interchangeability of parts is practical, and an initial installation may include the C-band unit mounted in the mounting plate to face the antenna.

13 Claims, 4 Drawing Sheets

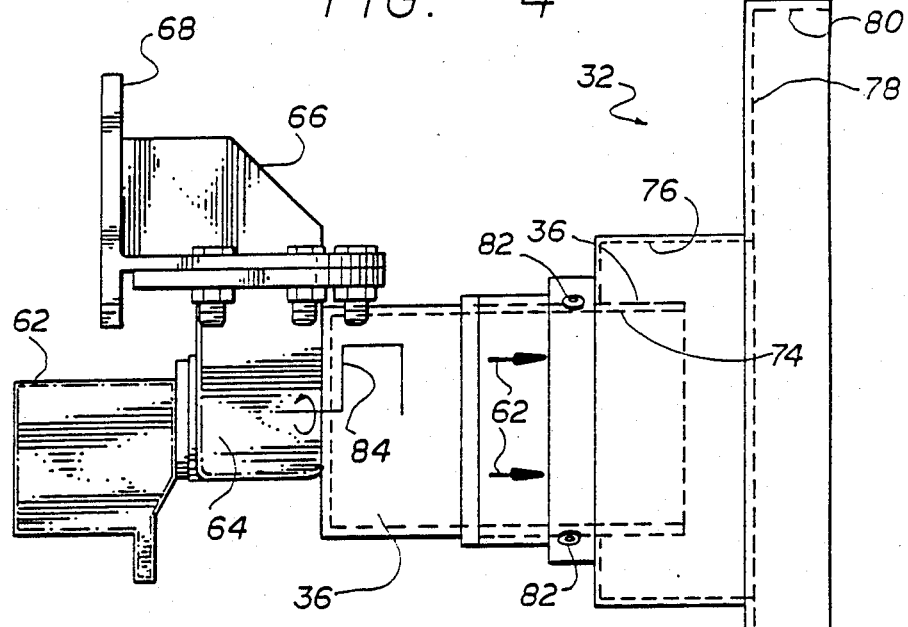
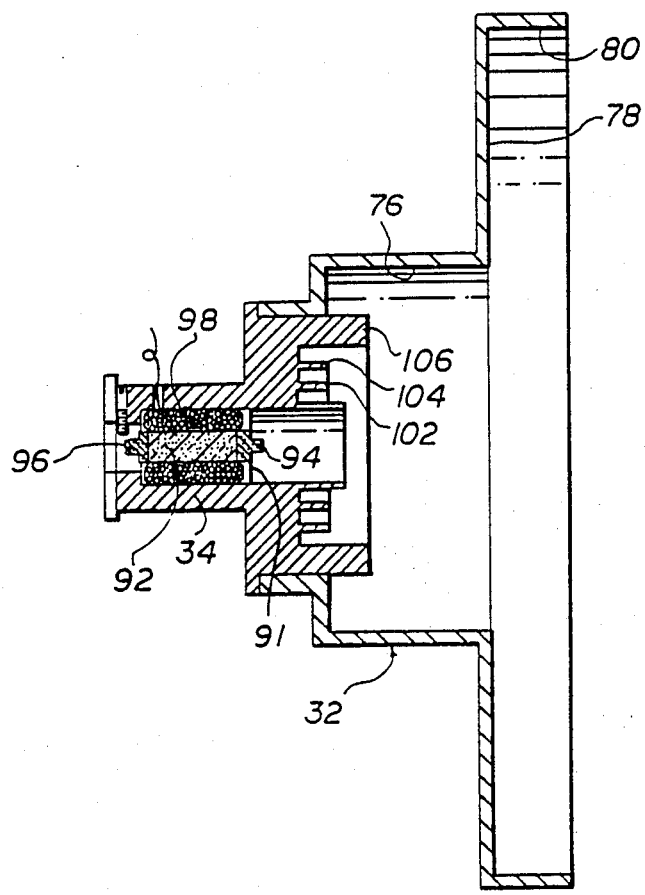

CONFIGURABLE KU-BAND RECEIVER FOR SATELLITE ANTENNA FEED

The present application is a continuation-in-part of co-pending Ser. No. 07/071,484, filed July 7, 1987, now U.S. Pat. No. 4,801,945.

FIELD OF THE INVENTION

This invention relates to satellite dish electromagnetic signal feed configurations.

BACKGROUND OF THE INVENTION

Dish-type antennae or antennas are widely used to receive signals from satellites. These dish antennas are usually about ten feet in diameter, and concentrate the received signal at the focal point of the dish, where the high frequency electromagnetic radiation is detected, amplified, and converted to a lower frequency for ease in transmission over coaxial cable to the television user's home.

In the past, most satellite transmissions were at C-band, having a frequency band of about $3.7 \times 10^9$ to $4.2 \times 10^9$ Hertz, or cycles per second. This is about 4 billion cycles per second, and, with the speed of light being about $3 \times 10^{10}$ centimeters per second, the wavelength is about 7-½ centimeters, or roughly three inches. This figure of three inches for the wavelength is significant, because antenna and associated electromagnetic waveguiding and wave handling structures must be physically matched to the length of the electromagnetic waves being handled.

More recently, certain satellites have also been transmitting at KU-band, at a frequency of about $11.7 \times 10^9$ to $12.2 \times 10^9$ Hertz. This corresponds to a wavelength of about one inch.

It would naturally be desirable to pick up both C-band and KU-band signals with a single dish installation. However, the different geometries required for handling the three inch electromagnetic waves and the one inch electromagnetic waves at the focus of a dish have caused significant difficulties in receiving and processing both frequency bands.

One initial attempt involved using the two necessary receiving assemblies, and placing them side by side each slightly away from the focal point of the dish antenna. However, the signals from the distant satellites are so weak, that the further degradation caused by this arrangement made it unsatisfactory.

Another attempted solution to the problem was to have a central small KU-band pick-up matched to the one inch wavelength, and two mutually orthogonal C-band pick-up members mounted around the KU-band assembly. In addition, two amplifier/converters were used, one for each of the C-band pick-ups. This arrangement was expensive as requiring the two amplifier/converters, and created an unwieldy, heavy, and out-of-balance assembly at the focal point of the dish.

Additional co-boresight attempts have proposed using a central small KU-band pick-up, and four peripheral C-band pick-up elements which transmit, via four waveguide or coaxial lines to an adjacent zone where four additional radiation elements re-generate the incoming C-band signal for pick-up by a single C-band antenna element. However, these proposed arrangements are relatively heavy, and introduce noise and loss as a result of passing through the transmission lines and two sets of antenna elements.

As noted hereinabove, prior proposals for providing a single installation to handle both C-band and KU-band have not been satisfactory; and accordingly, an important object of the present invention is to provide a new C-band and KU band configuration which provides optimum reception for signals of both bands, and which is not subject to the disadvantages of prior proposed arrangements, as discussed above.

It is further noted that, in converting from a system which handles only C-band signals to a system which handles both C-band and KU-band, the customer has had to throw away some of his C-band equipment, rather than merely purchasing new KU-band equipment to supplement his C-band equipment.

Accordingly, another object of the present invention is to provide a high quality compatible system wherein an initial C-band installation may be up-graded by the addition of KU-band equipment without the need for discarding any of the prior installation, and with minimal installation changes.

The external housing for the KU-band pickup must be designed in accordance with existing national regulations. These regulations usually specify external dimensions and mounting arrangements of the pickup unit to the main conductive support plate. In the past this has caused different designs of KU-band receiving units to be designed and manufactured to conform to the different regulatory standards. Accordingly, another object of the present invention is to provide a KU-band receiver which may be universally adapted for use under various regulatory requirements.

SUMMARY OF THE INVENTION

In accordance with an important aspect of the invention, a combined C-band and KU-band installation for mounting at the focal point of a satellite dish includes a main conductive mounting support plate member, or splash plate, and a KU-band pick-up assembly mounted centrally on the mounting plate to face the antenna. In addition, a C-band pick-up unit is mounted in front of the splash plate toward the satellite dish and spaced away from the conductive mounting plate to pick up signals reflected from the conductive plate. To avoid interference with the electromagnetic waves, the C-band unit is preferably supported by electromagnetically transparent material.

More specifically, and preferably, the C-band unit may be supported from the conductive mounting plate by a funnel-shaped support member of insulating or dielectric material such as polystyrene.

Concerning the configuration of the main conductive support plate, it is preferably recessed at the center, by about one-half wavelength so that the longer C-band wavelengths will penetrate to the bottom of the recess where the small KU-band pick-up is located, and be reflected back in phase with the C-band waves reflected directly from the face of conductive plate. Incidentally, with the opening to the KU-band pick-up being relatively small as compared with the longer C-band wavelength, virtually all of the C-band signal will be reflected back to the spaced C-band pick-up unit, and virtually none of it will be coupled to the KU-band pick-up.

As a collateral feature of the invention, the mounting opening (primarily) for the KU-band pick-up at the center of the main conductive support plate facing the satellite dish antenna, has substantially the same diameter as the smaller end of the dielectric support, which is preferably in a funnel-shaped configuration, for the C-band pick-up unit. Accordingly, for an initial installation for the new satellite dish owner, who wishes to initially have only C-band operation, the C-band unit may be mounted directly in the conductive support plate facing the antenna. Subsequently, if the owner wishes to convert to dual band reception, he need only purchase the KU-band pick-up unit, and associated electronics, and the dielectric funnel. Then the C-band unit is replaced by the KU-band unit, the dielectric funnel is secured to the face of the conductive mounting plate, and the C-band unit is mounted in the funnel facing the conductive plate to receive reflected C-band waves from it. Thus, nothing is thrown away in the course of up-grading from simple C-band operation to dual satellite band operation.

The mounting openings both in the main conductive mounting plate and in the funnel are between two and one-quarter and three inches in diameter, and successful results were achieved using a diameter of about 2.65 inches. In the case of the higher frequency KU-band pick-up, the central pick-up opening is only about 3/4 inch in diameter and additional concentric quarter-wave choke structures and an outer protruding impedance matching ridge are provided around the central pick-up opening.

It is further noted that when the C-band pick-up is employed in the single band mode directly with the conductive support plate, and facing the satellite antenna, the distance from the central opening to the edge of the plate is approximately one wavelength at C-band, forming a choke, and a second choke is formed at the central recessed area of the main support plate, where the C-band pick-up extends through and beyond the base of the recess, and parallel and concentric with the inner surface of the recess. With this double choke configuration, the terrestrial interference, or "T.I.", as it is known in the satellite antenna business, is greatly reduced.

It is noted that the signal strength for each band is very nearly the same with the new dual band configuration, as it would be for only one band. Further, the difficulties inherent with other designs have been eliminated. Also, as discussed above, upgrading from single band to dual band operation may be accomplished with no need to throw away any of the single band installation, and with improved "T.I." rejection, as compared with other installations.

Another feature of the present invention is the KU-band receiver which is adapted for use under various national regulatory standards. More specifically, the KU-band receiver includes a mounting ring which is selectively adapted for slidable engagement within the mounting aperture of the support plate or releasable attachment to the support plate. The mounting ring includes an input aperture to receive the KU-band signal. The KU-band receiver housing is adapted for releasable attachment to the mounting ring. The receiver housing at its first end portion has a bore which communicates with the input aperture of the mounting ring when housing is attached thereto. A second end portion of the receiver housing has an output aperture communicating with the internal bore. In one aspect of the present invention, the bore may contain the usual wave polarizer. Therefore, the receiver housing may be universally designed with a change of the releasably attached mounting ring to comply with local regulatory standards.

A further feature of the present invention is that a conventional Faraday rotator may be mounted to different types of mounting plates. The mounting plate may be connected directly to the arm of the disk antenna in place of the main conductive support plate described above. A cup-shaped mounting means secures the Faraday rotator to the mounting plate. For example, the mounting means may be threadably engaged to mounting threads on the mounting plate.

Other objects, features, and advantages will become apparent from a consideration of the following detailed description, and from the accompanying drawings.

BRIEF DESCRIPTION OF THE DRAWINGS

FIG. 4 shows a single, C-band installation, using the same main conductive mounting plate as is used for the dual band configuration as shown in FIGS. 2 and 3;

FIG. 5 is a more detailed cross-sectional showing of the main conductive mounting plate of the assembly, together with the KU band pick-up unit and polarizer.

DETAILED DESCRIPTION

Figure 1:
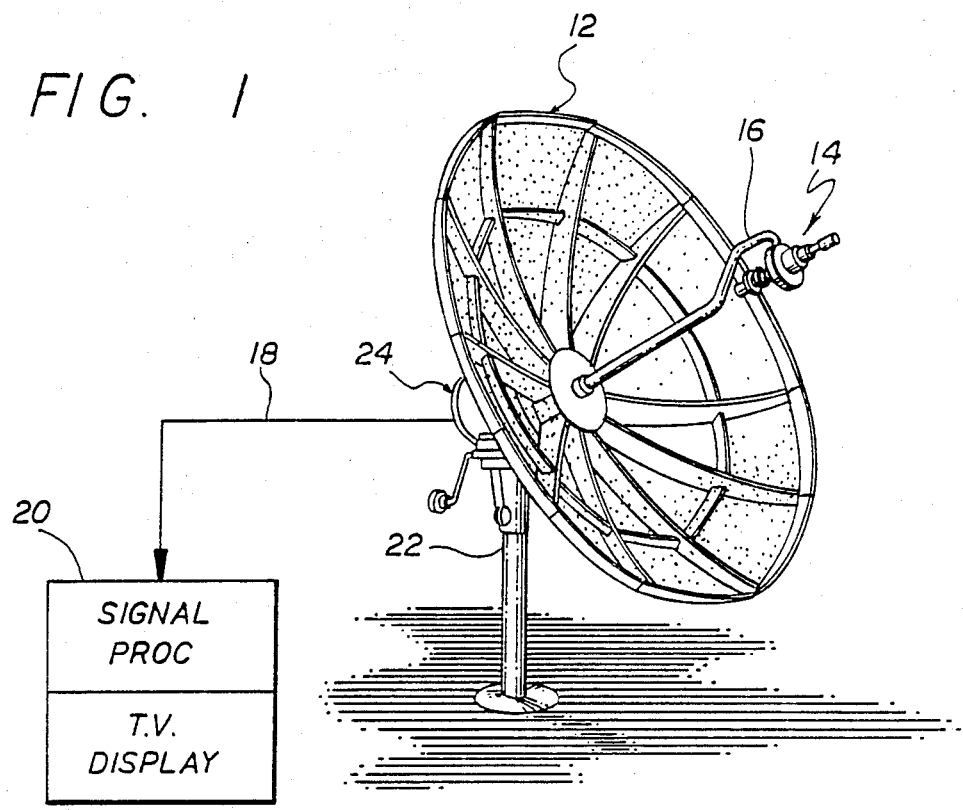
FIG. 1 is a diagrammatic showing of the complete dual band satellite signal receiving system, illustrating the principles of the present invention.

Referring more particularly to the drawings, FIG. 1 shows a satellite dish antenna 12 having a diameter of approximately 10 feet, and a dual band pick-up unit 14 mounted on the "button-hook" supporting rod 16 from the center of the satellite dish 12. The coaxial cable output from the dual band pick-up unit 14 is conducted through the hollow support member 16 away from the antenna installation on cable 18 to a remote signal processing and TV display unit 20, which would normally be located in the customer's home or premises. The dish antenna 12 is mounted on a support post 22, and includes the usual mechanism 24 for tracking satellites.

As mentioned hereinabove, satellites transmit signals on two principal frequency bands, C-band, having a frequency band of approximately $3.7 \times 10^9$ Hertz to approximately $4.2 \times 10^9$ Hertz, and a wavelength of approximately 3 inches; and on KU band, having a frequency of about $11.7 \times 10^9$ Hertz to about $12.2 \times 10^9$ Hertz and having a wavelength of approximately one inch. In addition, the incoming radiation from the satellites may be polarized at different orientations. Accordingly, in addition to having physical dimensions appropriate for accepting the proper wavelengths, the pick-up units must be adjustable to accept incoming radiation of different polarizations. In order to adjust the pick-up units to accept radiation at any incoming angle of polarization orientation, two principal methods are employed. In accordance with one method, a conductive pick-up element or wire which might characteristically be U-shaped, is oriented to the optimum angle by a servo motor, controlled remotely. In accordance with another known technique, the plane of polarization of the incoming wave may be rotated to any desired degree by a Faraday rotator. The Faraday rotator normally includes a cylindrical element of ferrite material, and an enclosing coil for applying an axial magnetic field to the ferrite element. The rotation of the plane of polarization of the propagating electromagnetic field depends on the strength of the axial magnetic field, so that by changing the current applied to the coil, the polarization may be rotated to the optimum angle for the pick-up unit in which the Faraday rotator is employed. Both of the foregoing two types of arrangements for handling different orientations of the plane polarization of the satellite radiation, are well known, and the systems to be disclosed hereinbelow may utilize either of them.

Figure 2:
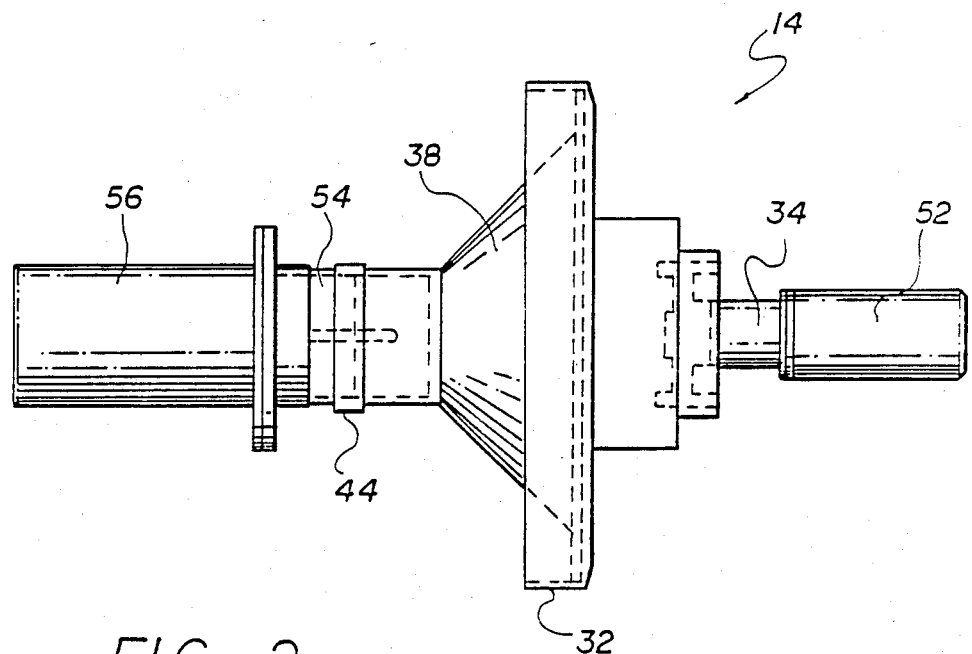
FIG. 2 is a diagrammatic showing of the dual band pick-up unit which is located substantially at the focal point of the satellite dish antenna.

Referring back to the drawings, reference will now be made to FIGS. 2 and 3, which show slightly different physical arrangements of a unit for accomplishing the same basic results. FIG. 2 is somewhat more schematic and to a smaller scale, while FIG. 3 is drawn to a larger scale and more accurately represents the relative size of the components which have been successfully tested in one practical embodiment of the invention.

Figure 3:
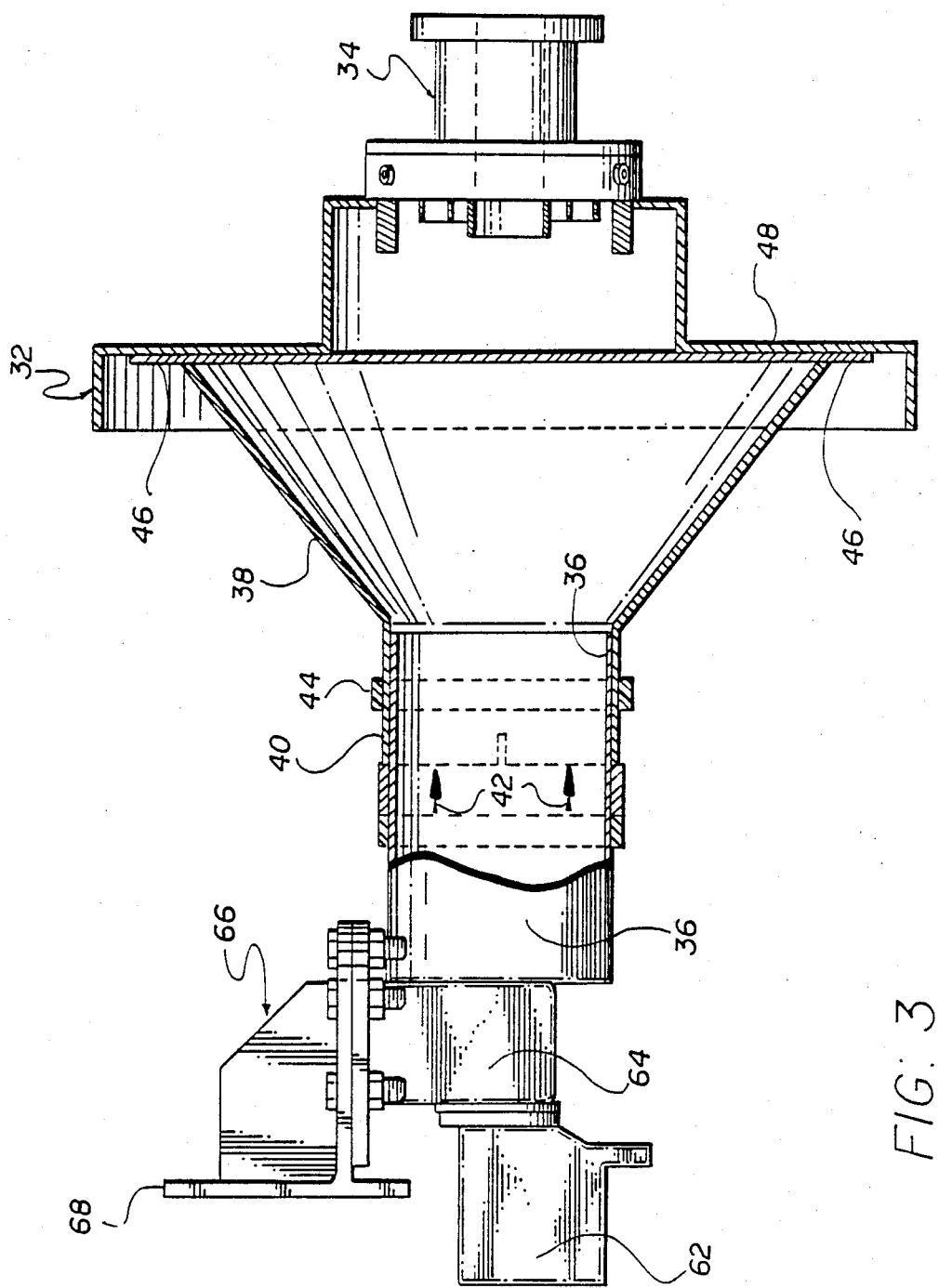
FIG. 3 is a more detailed showing of a dual band pick-up unit showing a servo motor polarizer for C-band signals.

In both FIGS. 2 and 3, the main conducting support plate member 32 is firmly connected to the "button hook" support rod 16, as shown in FIG. 1; and this support plate 32 is employed to support the remaining components of the systems shown in FIGS. 2 through 5 of the drawings. With reference to FIG. 3, the smaller KU-band pick-up assembly 34 is shown to the right, and the larger, lower frequency C-band pick-up unit 36 is mounted to the left as shown in FIG. 3, and would be closer to the satellite dish 12 than the KU band pick-up unit 34. The C-band unit 36 is mounted on the dielectric cone 38, which must be transparent to the incident electromagnetic waves, and have relatively high strength. In practice, it has been determined that a thin walled polystyrene cone fulfills all of these criteria. The C-band unit is cylindrical in configuration, and makes a relatively tight fit within the cylindrical portion 40 of the dielectric cone 38. As indicated by the arrows 42, the C-band pick-up unit 36 may be moved in or out to an optimum physical location for receiving the electromagnetic waves reflected from the main conducting support plate 32. It is then clamped into position by the nylon clamp 44. Incidentally, the front edge of the dielectric support cone 38 is provided with a flange 46 which is secured by screws into mounting holes in the extended flat surface 48 of the main conductive mounting plate 32.

Incidentally, the diameter of plate 32 is substantial, so that all of the C-band electromagnetic wave energy directed toward the focal point is intercepted by the conductive plate and directed to the C-band pick-up unit 36. In practice, it has been determined that good results have been achieved using a nine-inch diameter disk, but it is recommended that a diameter of at least 7 or 8 inches be used.

Now, referring back to FIG. 2 of the drawings, the KU-band unit 34 includes a Faraday-type plane of polarization rotator, of the type discussed hereinabove, and as shown in some detail in FIG. 5 of the drawings. Attached to the component 34 is the KU band "LNB" unit 52, with "LNB" standing for Low Noise Block-converter/ amplifier. This "LNB" unit includes an amplifier, and a frequency conversion circuit for converting down from the very high incoming microwave signals, to a frequency which may be readily transmitted over coaxial lines with little loss. Similarly, to the left in FIG. 2, the C-band unit includes a Faraday rotator 54 and a C-band "LNB" unit 56 for amplifying and converting the C-band signals down to a lower frequency. Typically the signals may be converted down to frequencies in the order of 400 Megahertz to 1500 Megahertz, for transmission to the signal processing and TV display unit 20, of FIG. 1.

In FIG. 3, the C-band signals are optimally coupled, from a plane of polarization standpoint, by the servo motor 62, and the section 64 of the unit through which an antenna element is rotated by the servo motor 62 in a manner known per se, and indicated schematically in FIG. 4 of the drawings, to couple the C-band signals to the waveguide 66. Coupled to the flange 68 of the waveguide section 66 would be a C-band amplifier and down-converter, of the type shown in FIG. 2 at reference numeral 56, and as discussed hereinabove.

FIG. 4 shows the C-band unit 36 of FIG. 3 mounted within the opening at the center of the main conductive support plate 32. The arrangement shown in FIG. 4 is a single band configuration, in which only C-band signals are received and utilized. As mentioned above, the customer who is initially purchasing a satellite system may start with a single band system which only includes C-band, and not KU band. Then, if he employs the starting system as shown in FIG. 4, he may convert to the dual band system of FIGS. 2 and 3, without having to throw away any of his originally-purchased equipment. Instead, as mentioned above, he may merely purchase the funnel-shaped support member 38, and the necessary KU band pick-up and processing unit, and switch the C-band installation to the other side of the support plate 32, all as shown in FIG. 3, for example.

Returning to FIG. 4, the arrows 72 indicate that the C-band pick-up unit 36 may be shifted axially in its position to optimize energy pick-up. In this regard, it may be noted that the re-entrant configuration of the inwardly protruding edge 74 and the recessed portion 76 of the conductive support member 32 forms one choke, and the outwardly extending portion 78 of the support member 32 together with the edge 80 thereof, forms a second choke. By the adjustment of the member 36 inwardly or outwardly, as indicated by the arrows 72, the operating characteristics of the double choke configuration and the impedance matching qualities of the geometry, may be optimized, so that maximum signal is received, and terrestrial interference, or "TI" may be rejected. Thus, the choke configurations reinforce signals which are received along the axis of the antenna, but reject spurious signals which are received off-axis, from local electromagnetic radiation sources. In passing, it is noted that set screws 82 are employed to secure the C-band pick-up structure 36 to the support member 32 in the desired axial position.

As shown in FIG. 4, the radiation receiving element 84 may be oriented at any desired angular position, by the servo motor included in unit 62. The servo motor within the unit 62 may be controlled from the signal processor 20 (see FIG. 1), to optimize pick-up relative to the particular polarization of the radiation from a specific satellite. As in the case of FIG. 3, the 90 degree C-band waveguide 66 will direct the C-band signal to an amplifier and down-converter which would be secured to the flange 68 of the waveguide component 66.

FIG. 5 is a more detailed showing of the KU band pick-up unit 34 mounted in the conductive support member 32. Considering the structure of the unit 34 in greater detail, it includes a Faraday effect rotator 91 having a ferrite cylinder 92, and ceramic transformer members 94 and 96 at the input and output of the ferrite member 92 to couple the electromagnetic waves in air, having a dielectric constant of unity, to the much higher dielectric constant of the ferrite material. A coil 98 of the Faraday rotator 91 produces an axial magnetic field in the ferrite cylinder 92, with the level of current in the coil 98 determining the magnetic field within the ferrite material 92, and the resultant rotation of the plane of polarization.

Returning to the upper end of the assembly 34, as shown in FIG. 5, it includes the two cylindrical rings 102 and 104 which form quarter wavelength chokes at KU band frequencies. In addition, the cylindrical member 106 performs an impedance matching function for the complete geometry, as shown in FIG. 3 of the drawings, for example.

It is to be noted that Faraday effect rotators have been used heretofore in satellite systems, as have servo-actuated radiation pick-up elements such as those shown at 62, 64 and 84, in FIG. 4. In addition, amplifiers and down-converters, such as those shown at reference numbers 52 and 56 in FIG. 2 of the drawings, are also known per se, and commercially available.

It is again noted that the mounting opening in the mounting plate 32, and the comparable mounting opening in the dielectric support funnel 38 have the same inner diameter, and this inner diameter matches the outer diameter of both the C-band and the KU band pick-up components, so that full interchangeability is provided. Thus, the C-band unit may be mounted on either side of the support member 32, either facing the antenna, as shown in the arrangement of FIG. 4, or facing away from the antenna as shown in FIGS. 2 and 3 of the drawings. In addition, if desired, the KU band unit could be mounted on either side of the antenna, either with or without accompanying C-band unit. However, the intended build-up of units would be with the C-band unit initially mounted as shown in FIG. 4 of the drawings, for a mono-band initial installation, with subsequent conversion to a dual band system of the type shown in FIG. 3. In either case, of course, either the Faraday effect type plane of polarization rotators, or the servo motor rotators may be employed to accommodate variations in the plane of polarization of the incident radiation being received from different satellites.

Referring now to FIGS. 6–9, there are shown alternative embodiments of the KU-band pickup unit 34. These alternate embodiments enable the KU-band pickup unit 34 to be adapted for use under the regulatory standards set forth for satellite dish antenna in the United States and Europe.

Figure 6:
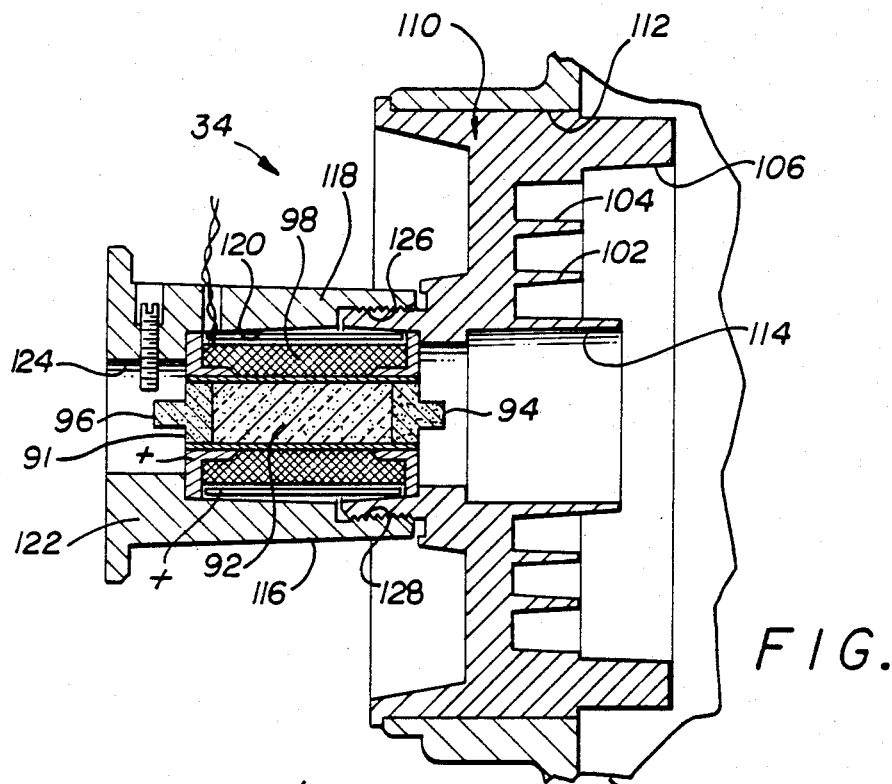
FIG. 6 is a view similar to FIG. 5 showing a further embodiment of the pick-up unit of the present invention.

Referring particularly to FIG. 6, the KU-band pickup unit 34 is substantially identical to the embodiment described hereinabove with reference to FIG. 5, wherein identical reference numerals are used to denote commonality of elements. The pickup unit 34 shown in FIG. 6 differs in that it is a two-part construction. The pickup unit 34 includes a mounting ring 110 which is adapted for slidable engagement within a mounting aperture 112 of the support plate 32. The mounting ring 110 includes an input aperture 114 to receive the KU-band signal. The KU-band receiver further includes a receiver housing 116 adapted for releasable attachment to the mounting ring 110. The receiver housing 116 includes first end portion 118 having a bore 120, and a second end portion 122 having an output aperture 124 communicating with the bore 120. The bore 120 communicates with the input aperture 114 when the housing 116 is attached to the mounting ring 110. The Faraday effect rotator 91 may be received within the receiver housing 116, and more particularly within the bore 120, similarly as described hereinabove with reference to FIG. 5.

To mount the receiver housing 116 to the mounting ring 110, the housing 116 further includes a threaded counter-bore 126 at its first end portion 118. The mounting ring 110 further includes a threaded annular member 128 extending coaxially outwardly therefrom and dimensioned to be received by the threaded counter-bore 126.

Figure 7:
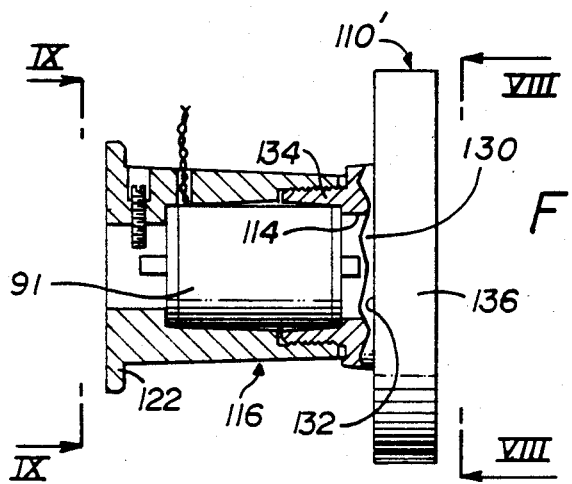
FIG. 7 is a view similar to FIG. 6 showing yet another further embodiment of the pick-up unit of the present invention.
Figure 8:
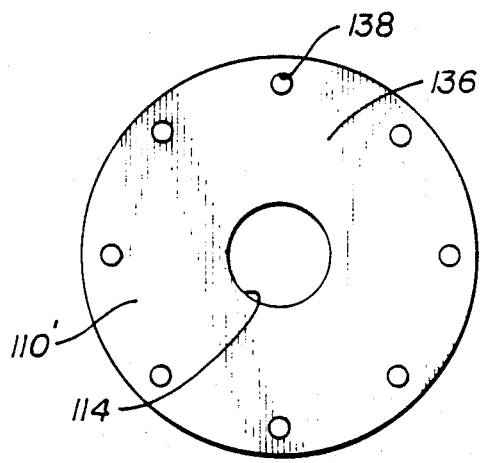
FIG. 8 is a view taken along line VIII-VIII of FIG. 7.

Referring now to FIG. 7, an alternative mounting ring 110' is shown which is adapted for releasable attachment to the support plate 32. The mounting ring 110' of FIG. 7 is used to construct the KU-band receiver pickup 34 for European applications. The mounting ring 110' also includes the input aperture 114 extending therethrough. More particularly, the mounting ring 110' includes a cylindrical member 130 having a first side portion 132 and a second side portion 134. First portion 132 has an annular flange 136 adapted for releasable attachment to the support plate 32. The second side 134 is adapted for releasable attachment with the receiver housing 116 which includes the Faraday rotator 91 as hereinabove described. As best seen in FIG. 8, the input aperture 114 is circular and coaxially disposed within the flange 136. A plurality of openings 138 is provided to receive bolts attaching the mounting ring 110' to the support plate 32. The mounting ring 110' may also be directly mounted to the support rod 16 in place of the main conductive plate 32.

Figure 9:
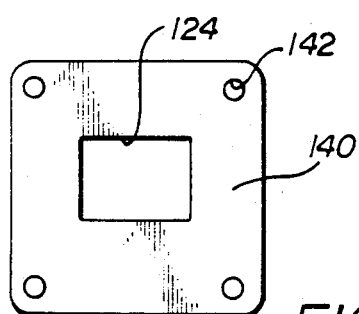
FIG. 9 is a view taken along line IX-IX of FIG. 7.

As best seen in FIG. 9, the second end portion 122 of the receiver housing 116 includes a rectangular flange 140 which is adapted for mounting additional equipment thereto such as the LNB unit 52. Accordingly, the rectangular flange 140 includes openings 142 which may receive bolts or other fasteners therethrough. The output aperture 124 is also rectangular to match the waveguide of the additional equipment.

In conclusion, it is to be understood that the foregoing description and the accompanying drawings illustrate the preferred embodiments of the invention. However, the present invention is not limited to the precise arrangements as shown in the drawings and as described hereinabove. Thus, by way of example and not of limitation, instead of a continuous funnel for supporting the C-band unit, as shown in FIG. 3, strips or rods of dielectric material which are transparent to microwaves, may be employed. In addition, other microwave choke and impedance-matching configurations may be substituted for those employed in the implementation of the present invention. Further, instead of an integral KU-band pick-up unit of relatively large diameter, an adaptor ring could be used between a smaller KU-band pick-up, and the larger opening in the conductive plate member 32. Accordingly, the present invention is not limited to the precise showings of the drawings, and the specific description as set forth hereinabove.

What is claimed is:

1. In a satellite dish antenna having a main conductor support plate mounted substantially at a focal point of said dish antenna, said support plate having a central mounting aperture of a pre-determined diameter, a KU-band receiver comprising:
   a mounting ring selectively adapted for slidable engagement within said mounting aperture and releasable attachment to said support plate, said mounting ring including an input aperture extending therethrough to receive KU-band electromagnetic energy; and
   a housing adapted for releasable attachment to said mounting ring, said housing including a first end portion having a bore, and a second end portion having an output aperture, said bore interconnecting said output aperture with said input aperture when said housing is attached to said mounting ring.

2. A receiver as set forth in claim 1 wherein said housing further includes a threaded counter-bore in said first end portion, and wherein said mounting ring further includes a threaded annular member dimensioned of to be received by said threaded counter-bore.

3. A receiver as set forth in claim 1 wherein said input aperture is circular.

4. A receiver as set forth in claim 1 wherein said output aperture is rectangular.

5. A receiver as set forth in claim 4 wherein said second end portion of said receiver housing includes a rectangular flange adapted for mounting additional equipment.

6. A receiver as set forth in claim 1 wherein said mounting ring includes:
   a cylindrical member having a first end portion and a second end portion, said input aperture coaxially extending between said first end portion and said second end portion, said first end portion having an annular flange adapted for releasable attachment to said support plate, said second end portion being adapted for releasable attachment to said receiver housing.

7. A receiver as set forth in claim 6 wherein said second end portion of said cylindrical member includes a threaded annular member extending coaxially outwardly therefrom, said receiver housing further including a threaded counter-bore dimensioned to receiver said threaded annular member.

8. A receiver as set forth in claim 1 wherein said mounting ring includes a cylindrical member having a first end portion and a second end portion, said input aperture coaxially extending between said first end portion and said second end portion, said cylindrical member being dimensioned for receipt by said mounting aperture, said first end portion facing said support plate, said second end portion being adapted for releasable attachment with said receiver housing.

9. A receiver as set forth in claim 8 wherein said first end portion of said cylindrical member includes an annular extension extending coaxially outwardly therefrom to provide for impedance matching at said input aperture.

10. A receiver as set forth in claim 8 wherein said first end portion of said cylindrical member includes a plurality of coaxial annular rings therein to provide a quarter wavelength choke.

11. A receiver as set forth in claim 8 wherein said second end portion of said cylindrical member includes a threaded annular member extending coaxially outwardly therefrom, said receiver housing further including a threaded counter-bore dimensioned to receive said threaded annular member.

12. A receiver as set forth in claim 1 wherein said receiver further comprises:
   a wave polarizer disposed in said bore.

13. A variable configuration satellite antenna receiver system comprising:
   a substantially cylindrical Faraday effect rotator for rotating the plane of polarization of received satellite signals;
   a mounting ring having a central aperture for receiving satellite signals, a first side and a second side;
   means for mounting said mounting ring substantially at the focal of a satellite antenna with said first side and said second side of said ring facing forward and away from the antenna, respectively;
   said mounting ring further having mounting threads around said aperture on said second side of said mounting ring; and
   housing means for mounting said Faraday effect rotator to said ring, said mounting means being partially closed and having a central opening at one end thereof, and being open and having mounting threads for securing to the mounting threads on said plate at the other end thereof;
   whereby said Faraday effect rotator may be selectively mounted to different mounting rings by said housing means.

* * * * *